United States Patent [19]

Halliday

[11] Patent Number: 5,103,417
[45] Date of Patent: Apr. 7, 1992

[54] DIGITAL MULTI-CHANNEL COUNTER METHOD AND APPARATUS TO REDUCE COUNTING HARDWARE

[75] Inventor: Daniel L. Halliday, Granger, Ind.

[73] Assignee: Allied-Signal Inc., Morris Township, Morris County, N.J.

[21] Appl. No.: 475,525

[22] Filed: Feb. 6, 1990

[51] Int. Cl.⁵ .......................................... G06F 15/336
[52] U.S. Cl. .................... 364/728.03; 377/49
[58] Field of Search ................. 364/728.03-728.07; 377/49

[56] References Cited

U.S. PATENT DOCUMENTS

| | | | |
|---|---|---|---|
| 4,575,864 | 3/1986 | Rice, Jr. et al. | 364/728.03 |
| 4,860,357 | 8/1989 | Avery | 364/728.07 |
| 4,939,683 | 7/1990 | van Heerden et al. | 364/728.03 |

OTHER PUBLICATIONS

Zohar, "New Hardware Realizations of Nonrecursive Digital Filters", *IEEE Trans. on Computers*, vol. C-22, #4, pp. 328-338, Apr. 1973.
Jones, "The Single-Clipped Digital Malvern Correlator", Conference: Colloquism on Correlation Processing, London England, pp. 711-714, 2 May 1979.
Lerbowsky, "Digital Correlator Speed Improvement by Multiplexing", Naval Research Laboratory, Washington, D.C., 9/30/83.

*Primary Examiner*—Dale M. Shaw
*Attorney, Agent, or Firm*—Donald B. Paschburg; Howard G. Massung; Robert A. Walsh

[57] ABSTRACT

In systems requiring multiple identical digital correlators the original m-bit counter for each correlator can be replaced by an n-bit multi-channel counter. The most significant bit of each n-bit counter is sampled every $2^{n-1}$ clock cycles and the results are stored in dual port memory. Stored input counter samples are converted into a series of binary words which are multiplexed to one of two signal outputs. The dual port memory allows current samples from the input counters to be written on port A, while previously written samples are time multiplexed and read to the output counters on port B. This design not only reduces the number of parts needed for counters but also the buffers needed for so many counters to appear on the same computer bus. In addition, the maximum delay between the sampling of any correlator is greatly reduced.

10 Claims, 2 Drawing Sheets

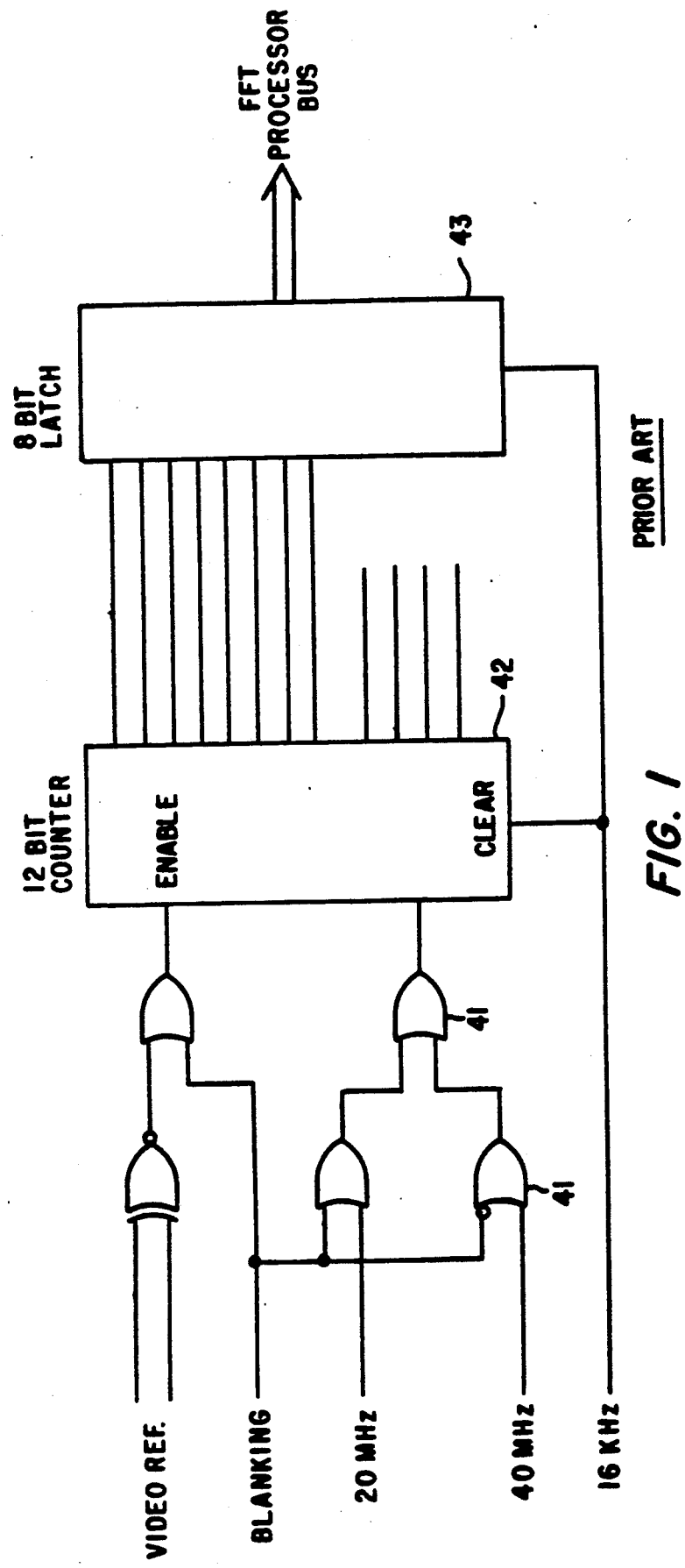

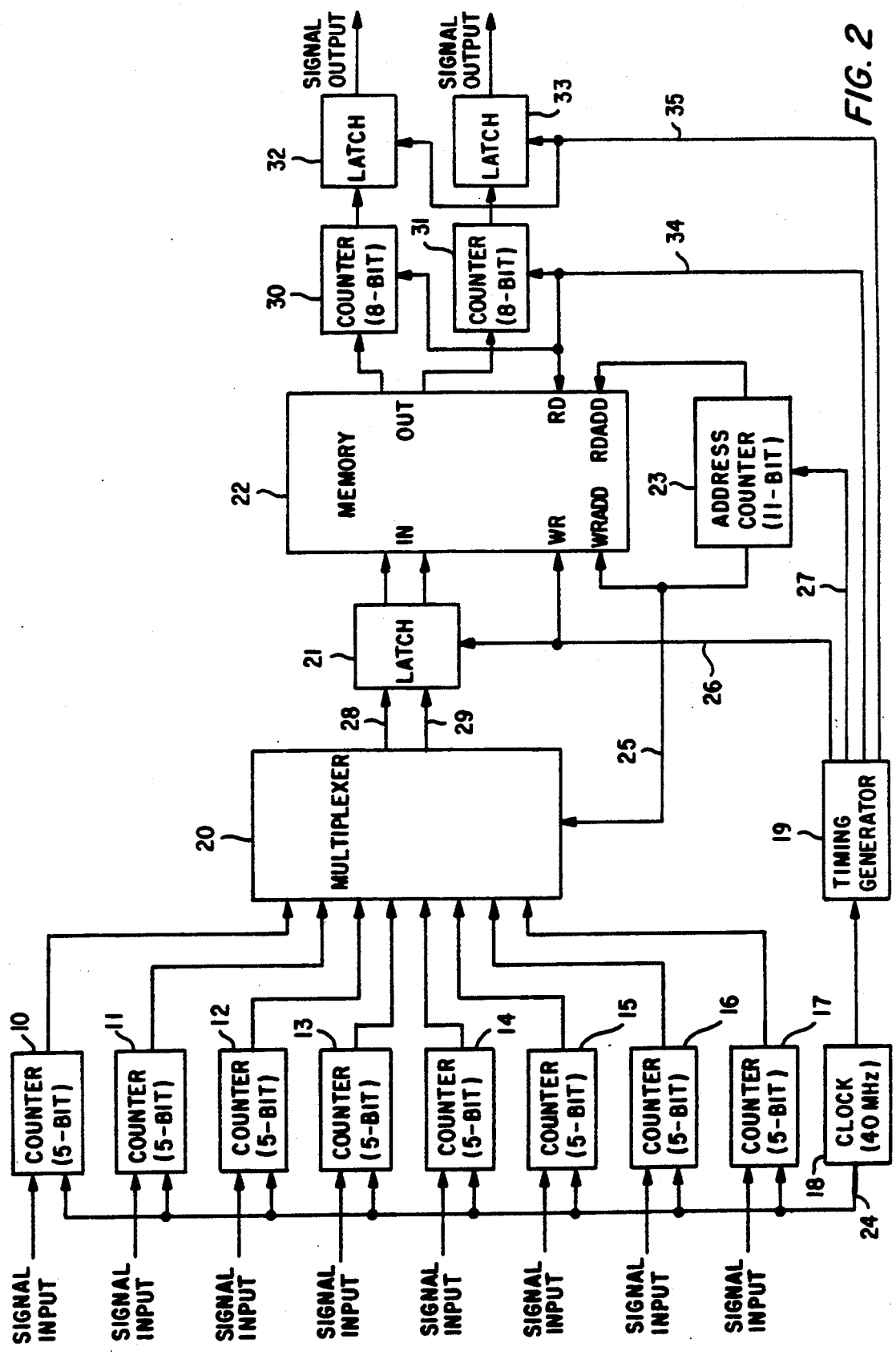

DIGITAL MULTI-CHANNEL COUNTER METHOD AND APPARATUS TO REDUCE COUNTING HARDWARE

BACKGROUND OF THE INVENTION

1. Field of the Invention

This invention relates to the field of digital correlation and more particularly to counter circuitry used in a digital correlator.

2. Description of the Prior Art

Included in the prior art is a digital correlation method and apparatus which makes use of an exclusive-OR multiplier, a digital counter, and a microprocessor. Typically, a signal is multiplied by a reference in the exclusive-OR to produce a logic one at the output when the inputs are the same, and a logic zero at the output when the inputs are not the same. The bit stream out of the exclusive-OR is assembled into binary words by the counter. The counter operates for a fixed period, and the binary words are output to the microprocessor at a constant rate. This digital correlation method, which is used in random signal radar for the recovery of the received signal from receiver noise, was devised to save much of the space and cost associated with analog circuits. However, a high resolution random signal radar often requires implementation of many correlators, resulting in the devotion of much space to the correlator hardware. The major user of space in the digital correlator is the counter. Thus, there is a need in the art for a method of performing the counter function while utilizing less space.

SUMMARY OF THE INVENTION

Accordingly, it is an object of the present invention to provide a multi-channel digital counter that performs the functions of a number of individual counters while utilizing a relatively small space.

The above object is attained by the present invention which replaces the original m-bit counter in multiple, identical digital correlators with an n-bit input counter, where n is less than m. The number of bits in the prior art input counter is defined by m while the number of bits in the input counter of the present invention is defined by n. The most significant bit of each n-bit counter is sampled every $2^{n-1}$ clock cycles, and the results are stored in dual port RAM. Stored input counter samples are time multiplexed into a p-bit output counter, where $p = m - n + 1$. The dual port RAM allows current samples from the input counters to be written on port A, the input port of the dual port RAM, while previously written samples are time multiplexed and read to the output counters on port B, the output port of the dual port RAM. It can be seen that the final count from the output p-bit counter is missing the n−1 least significant bits present in the output of the original m-bit counters. If these bits are important, the final count from the n−1 least significant bits in the input counter can be added to the final count from the output counter. Otherwise, the n−1 least significant bits can be ignored.

BRIEF DESCRIPTION OF THE DRAWINGS

FIG. 1 illustrates a schematic block diagram of a basic digital correlator.

FIG. 2 illustrates a schematic block diagram of the present invention.

DETAILED DESCRIPTION OF THE INVENTION

The basic digital correlator block diagram is illustrated in FIG. 1. This diagram contains a single correlator comprising various gates 41, a 12-bit counter 42 and an 8-bit latch 43. In order to implement multiple correlators the components shown in FIG. 1 must be duplicated. The difficulty in this basic design lies in the number of overall counters necessary to form multiple correlators.

In FIG. 2 is seen a schematic block diagram of the present invention. In this embodiment, eight 12-bit counters (m=12) from eight digital correlation channels which would have been required if utilizing the design of FIG. 1, have been replaced by the 8-channel counter illustrated. At each Signal Input is a bit stream of 1's and 0's output from an exclusive-OR multiplier. The circuitry of the present invention converts each of these eight inputs into a series of 8-bit binary words which are multiplexed to one of the two Signal Outputs. These binary words are output to a microprocessor bus and serve as the signal samples for fast Fourier transform (FFT) processing. Each binary word represents the accumulated count of 1's in the appropriate channel over the previous interval.

Consider now the operation of input counter 10, which is representative of all eight input counters 10 through 17. The signal to be counted is applied at the Signal Input to input counter 10. Also input to input counter 10 on lead 24 is the output of clock 18. A 1 at the Signal Input enables input counter 10 which then proceeds to count clock cycles until a 0 appears at the Signal Input and disables the counter. Given that input counter 10 in this embodiment is a 5-bit counter (n=5), the count accumulated over any given time interval is equal to the remainder obtained when the number of 1's in the input signal over that same interval is divided by 32. The most significant bit in input counter 10 is sampled every 16 clock cycles ($2^{n-1} = 16$), the maximum rate at which the most significant bit of a 5-bit counter can change. In this embodiment, the clock frequency is 40 MHz and the fifth bit of input counter 10 is sampled every 400 nsec. Clock 18, timing generator 19, address counter 23, multiplexer 20, and latch 21 cooperate to sample input counter 10 and the other seven input counters once every 400 nsec, multiplex the results to two lines, and store the multiplexed data in memory 22.

Multiplexer 20 is a switch controlled by address counter 23 through signals on lead 25. The switching frequency is 10 MHz, and a different input can be switched to the output every 100 nsec. Each input is sampled every 400 nsec, with the result that tour inputs are multiplexed to one output. Samples of the fifth bit from input counters 10, 11, 12, and 13 are multiplexed to lead 28, while samples of the fifth bit from input counters 14, 15, 16, and 17 are multiplexed to lead 29. Both sets of data are input to latch 21, where the latching operation is controlled from timing generator 19 over lead 26. Data samples are captured by latch 21 for transfer to memory 22. The data from each input counter is stored in memory 22 in blocks of 160 bits.

As eight blocks of 160 bits (one block of 160 bits from each input counter) are read in to memory 22 for storage, the preceeding eight blocks of 160 bits are read out of memory 22 for continued processing. Clock 18, timing generator 19, and address counter 23 cooperate to extract data from memory 22 for processing in 8-bit output counters 30 and 31 (m−n+1=8). Input to output counter 30 is a bit stream of 1's and 0's from memory 22. The first 160 bits in this stream are from input counter 10, followed in the order by 160 bits from input counter 11, 160 bits from input counter 12, and 160 bits from input counter 13. Also input to output counter 30 on lead 34 is the output of timing generator 19, which serves as a 10 MHz clock for output counter 30. A 0 to 1 transition on the input line enables the counter to increment by 1 on the next imput clock, line 34, transition. The counter is disabled if the 0 to 1 transition is not present on the input line. The count accumulated by output counter 30 is equal to the number of 0 to 1 transitions in the 160 bits from input counter 10 previously stored in memory 22. When all 160 bits from input counter 10 have been clocked into output counter 30, the accumulated count of 1's is captured by output latch 32 under control from timing generator 19 over lead 35. The 8-bit word captured by output latch 32 is then available for transfer to the FFT bus, while output counter 30 is available to receive the bit stream of data from input counter 11. The process repeats for data from input counters 11, 12, and 13 after which the next set of data from input counter 10 is processed through output counter 30. In the same manner, data from input counters 14, 15, 16 and 17 are processed through output counter 31 and output latch 33.

To simultaneously write and read bit streams into and out of memory 22, the present invention operates in the following manner. Memory 22 has a writing input WR which when energized causes memory 22 to write whatever bit is present at the input IN in the address location identified by a binary word at the write address input WRADD. Memory 22 also has a reading input RD which when energized causes the bit stored in a location of memory 22 identified by a binary word at the read address input RDADD to be read at the output OUT. Timing generator 19 driven by clock 18 periodically and simultaneously energizes write input WR and read input RD to thereby put memory 22 simultaneously in a writing and a reading mode. One section of memory 22 is written while another section is read. This can be done because write and read times are about the same. As described above, each input counter is sampled once every 400 nsec, so that 160 samples are collected in 64 μsec. After multiplexing of the counter samples, each signal input to memory 22 consists of the interleaved samples from four input counters which are written to memory 22 at a rate of one sample every 100 nsec. At the output of memory 22, all 160 samples from one input counter are read at a rate of one sample every 100 nsec, for a total read time of 16 μsec. This is followed in sequence by 160 samples from each of three other input counters, for a total read time on the four sets of data of 64 μsec.

The above described design not only reduces the number of parts needed for counters but also the buffers needed for so many counters to appear on the same computer bus. In addition, the maximum delay between the sampling of any correlator is greatly reduced.

It is not intended that this invention be limited to the hardware or software arrangement, or operational procedures shown disclosed. This invention includes all of the alterations and variations thereto as encompassed within the scope of the claims as follows.

I claim:
1. A digital multi-channel counter comprising:
 a plurality of input counters with each of said plurality of input counters receiving a signal input and providing an output; and,
 circuitry means connected to said output of each of said plurality of input counters for converting said output of each of said plurality of input counters into a series of binary words which are outputted; wherein said circuitry means comprises:
 multiplexer timer means for sampling said output of each of said plurality of input counters and for providing a time multiplexed output;
 dual port memory means for receiving said time multiplexed output from said multiplexer timer means and for outputting stored input counter samples;
 address counter means for controlling said multiplexer timer means and said dual port memory means;
 output counter means for receiving said stored input counter samples from said dual port memory means;
 output latch means connected to said output counter means for catching an accumulated count from said output counter means and for outputting a series of binary words onto a microprocessor bus;
 timing generator means for controlling said multiplexer timer means, said address counter means, said output counter means and said output latch means; and,
 clock means for controlling said plurality of input counters and said timing generator means.

2. A digital multi-channel counter as claimed in claim 1 wherein said multiplexer timer means comprises:
 multiplexer means connected to said plurality of input counters; and,
 latch means for receiving an output from said multiplexer means and for performing a latching operation of catching data samples and transferring said data samples into said dual port memory means.

3. A digital multi-channel counter as claimed in claim 1 wherein:
 a most significant bit of each of said plurality of input counters is sampled every $2^y$ clock cycles, where y equals the number of bits of said input counters minus one, and results are stored in said dual port memory means.

4. A digital multi-channel counter as claimed in claim 1 wherein:
 said dual port memory means allows current samples from said plurality of input counters to be written on input port of said dual port memory means while previously written samples are time multiplexed and read to said output counter means on outport port of said dual port memory means.

5. A digital multi-channel counter as claimed in claim 1 wherein:
 said dual port memory means receives interleaved samples from half of said plurality of input counters.

6. A digital multi-channel counter as claimed in claim 1 wherein:
 said dual port memory means stores said time multiplexed output in blocks of bits.

7. A digital multi-channel counter as claimed in claim 1 wherein:
 said series of binary words which are outputted are multiplexed to two signal outputs.

8. A digital multi-channel counter as claimed in claim 1 wherein:

each binary word of said series of binary words represents an accumulated count of 1's in an appropriate channel.

9. A digital multi-channel counter comprising:

a plurality of n-bit input counters replacing an original equal plurality of m-bit input counters, where m and n define number of bits of an input counter and n is less than m, each of said plurality of m-bit counters found in one of a plurality of original correlators and each of said plurality of n-bit input counters receiving a signal input and providing an output;

multiplexer timer means for sampling said output of each of said plurality of n-bit input counters and for providing a time multiplexed output;

dual port memory means for receiving said time multiplexed output from said multiplexer timer means and for outputting stored input counter samples;

address counter means for controlling said multiplexer timer means and said dual port memory means;

output counter means for receiving said stored input counter samples from said dual port memory means;

output latch means connected to said output counter means for catching an accumulated count from said output counter means and for outputting a series of binary words onto a microprocessor bus;

timing generator means for controlling said multiplexer timer means, said address counter means, said output counter means and said output latch means; and, clock means for controlling said plurality of n-bit input counters and said timing generator means.

10. A digital multi-channel counter as claimed in claim 9 wherein:

said output counter means comprises a p-bit output counter having $p = m - n + 1$.

* * * * *